March 4, 1924.  
F. H. MORLAN  
BRAKE MECHANISM  
Filed June 4, 1921     2 Sheets-Sheet 2  
1,485,802
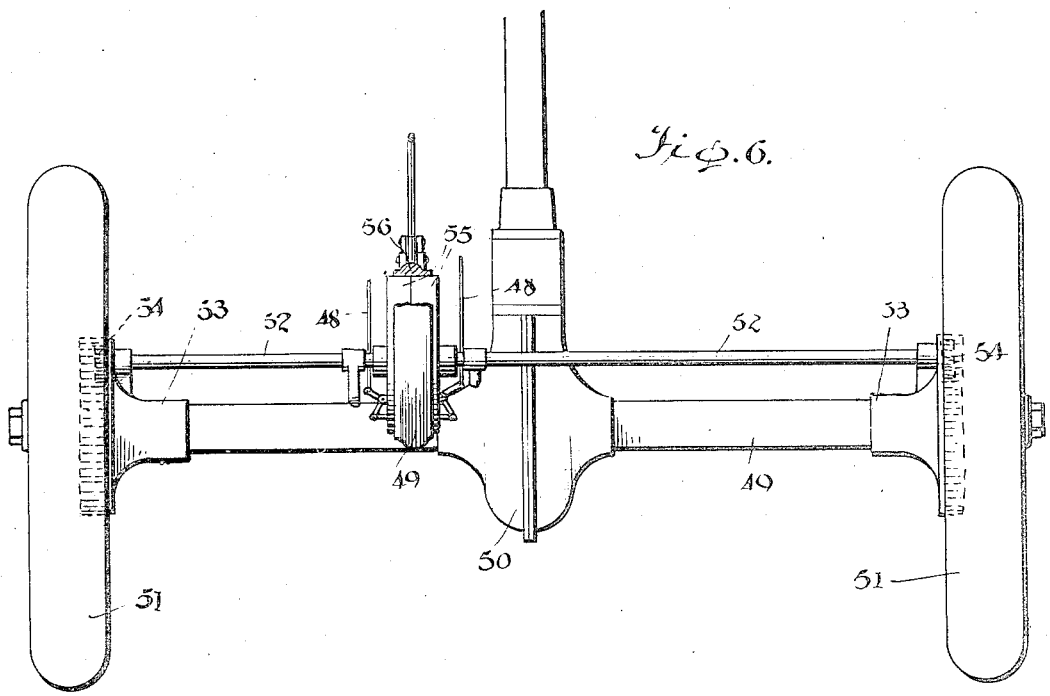
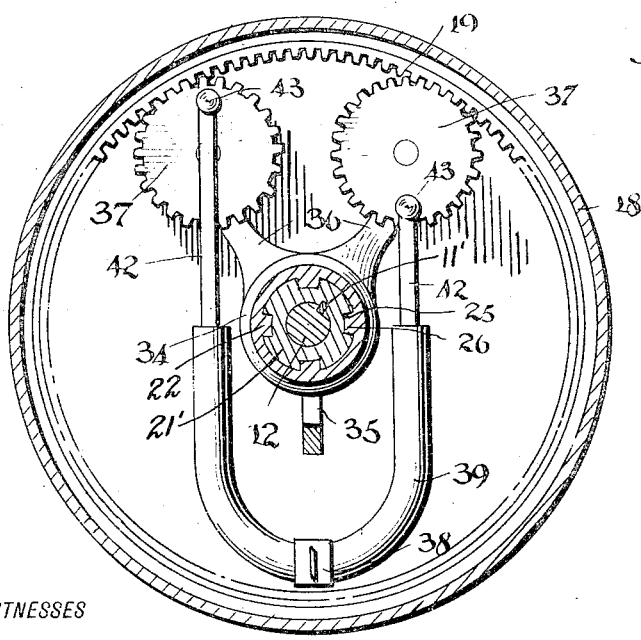
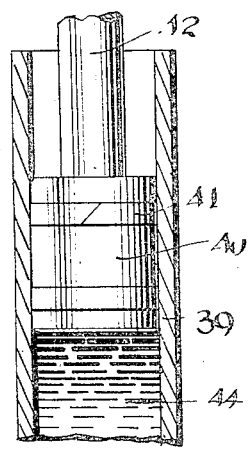
WITNESSES
INVENTOR  
F. H. Morlan,  
BY  
ATTORNEYS Patented Mar. 4, 1924.

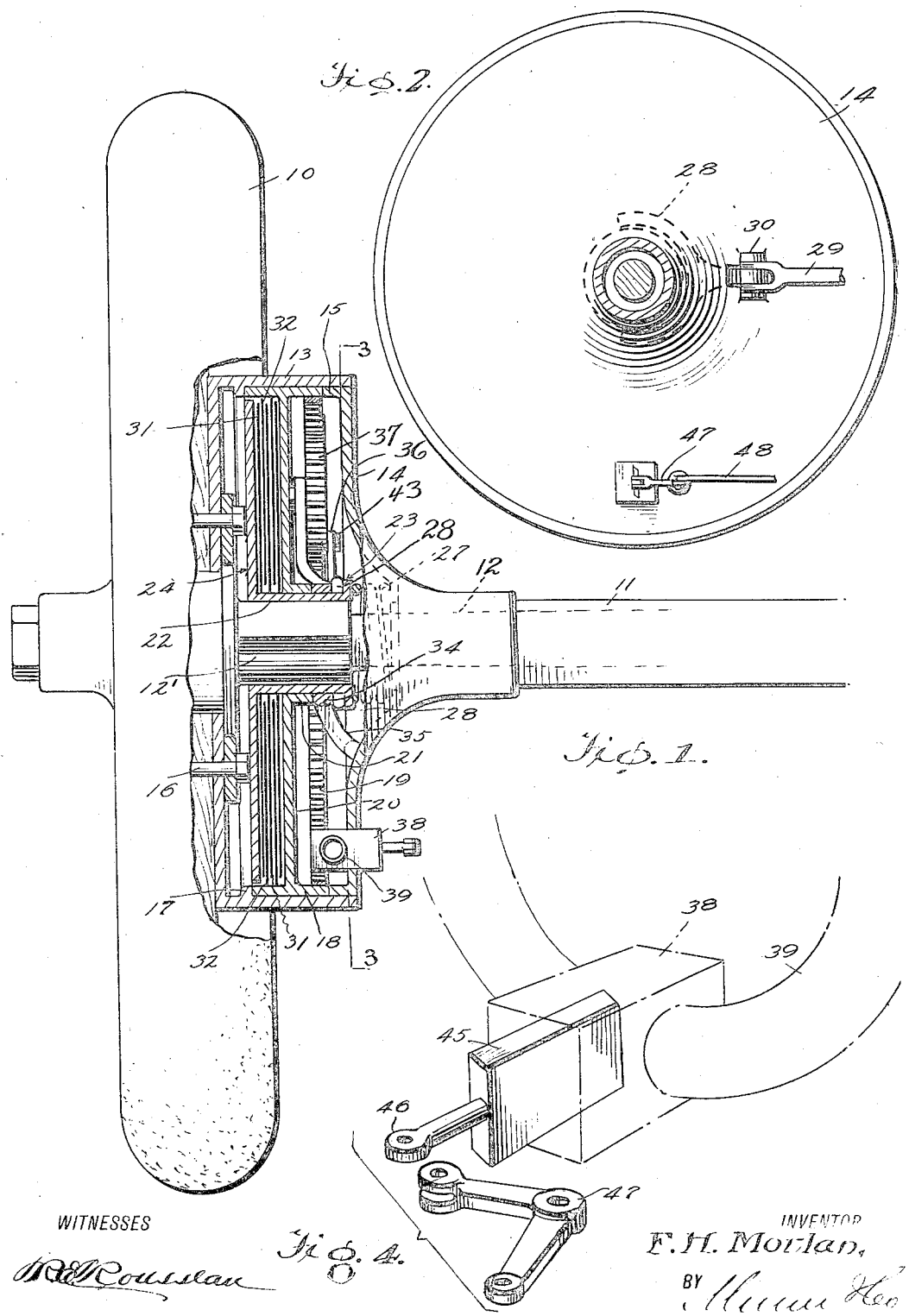

1,485,802

UNITED STATES PATENT OFFICE.

FREDERICK H. MORLAN, OF FAIRFIELD, ILLINOIS.

BRAKE MECHANISM.

Application filed June 4, 1921. Serial No. 475,020.

*To all whom it may concern:*

Be it known that I, FREDERICK H. MORLAN, a citizen of the United States, and a resident of Fairfield, in the county of Wayne and State of Illinois, have invented certain new and useful Improvements in Brake Mechanism, of which the following is a specification.

This invention relates to a brake mechanism for motor vehicles or the like.

The object of the invention is to provide a brake of the above character by which a motor vehicle may be brought to a gradual or abrupt stop without undue strain upon the parts thereof.

It is also an object of the invention that the brake mechanism may be operated from the steering wheel of a motor vehicle with which it may be associated.

It is a further object of the invention that the brake mechanism be certain in operation.

Other objects and objects relating to details of construction, combination and arrangement of parts will hereinafter appear in the detailed description to follow.

The invention is illustrated by way of example in the accompanying drawings, in which:

Figure 1 is a detail vertical sectional view of the brake mechanism when associated with the brake drum of an automobile, Figure 2 is an end elevation of the brake drum and associated hub illustrating the means for operating the brake mechanism, Figure 3 is a vertical transverse sectional view taken substantially on the lines 3—3 of Figure 1, Figure 4 is a group view showing a perspective view of the brake valve and its associated parts, Figure 5 is a detail sectional view of one of the pump cylinders and associated piston, Figure 6 is a plan view showing another application of the brake mechanism.

Referring to the drawings in detail, and particularly to Figures 1 to 5 inclusive, 10 indicates a rear wheel of an automobile, 11 the axle housing, 12 the spindle, 13 the brake drum, and 14 the usual hub member associated therewith, said hub member having the usual outwardly extending flange portion 15. The brake drum 13 is secured to the wheel hub by the bolts 16 and in this instance, the inner periphery of the brake drum is formed with a flange 17, and between the flange 17 and flange portion 15 of the hub member 14, there is fitted a casting 18 which is formed with an internal gear 19. The casting is also formed with a transverse wall 20 which is provided at its central portion with a sleeve 21, which telescopes a second sleeve 22, the sleeve 22 in turn the sleeve or collar 12' which encircles the spindle 12. The sleeve 22 has formed on its inner end a radial flange 23, and at its outer end a disk flange 24, the periphery of which is in spaced relation with the inner periphery of the casting as shown.

The collar 12' is secured to spindle 12 by a key 11' and collar 12' is formed with a plurality of longitudinally extending grooves 25 adapted to accommodate ribs 26 formed upon the inner surface of the sleeve 22. The sleeve 22 may be shifted longitudinally upon the collar 12' and is held for rotative movement with said collar 12' and also spindle 12.

A spiral spring 27 encircles the spindle 12 and is interposed between the hub 14 and flange 23 of member 22. Adjacent the inner side of the flange 23, there is positioned a shifter fork 28 which may be connected to the rod indicated at 29, Figure 2, through a bell crank indicated at 30, the bell crank being suitably mounted upon the outer surface of the hub member 14. The rod 29 is of course, extended to the forward part of the automobile with which the present invention is associated, and suitably connected with a foot pedal or the like by which the same may be operated for drawing the sleeve 22 against the tension of the spring 27.

The sleeve 22 also carries a plurality of friction disks indicated at 31, which when brought into engagement with similar disks 32 carried by the casting 18, the rotative movement of the sleeve 22 will be transmitted to the casing 18. The disks 31 and 32 are brought into engagement by shifting the sleeve 22 toward flange or wall 20.

Between the sleeve 21' and the radial flange 23 of the sleeve 22, there is positioned a collar 34 which is held against movement by an arm 35 extending therefrom and having its outer end secured to the hub member 14, as shown. Also from the collar 34 there extends a pair of radial arms 36 each having journaled upon its outer end a gear 37 and each gear 37 being adapted to continuously mesh with the internal gear 19.

Adjacent the lower side of the hub member 14 there is positioned a block 38 through which there extends the bridge portion of a U-shaped tube 39, said tube being supported by the block and rigidly held against movement. Each leg of the tube 29 has fitted therein a piston 40, provided with suitable packing 41, and suitably connected with a connecting rod 42. The outer end of each connecting rod 42 is connected to the associated gear 37 by the means of a crank pin indicated at 43. The tube 39 may contain oil or other suitable liquid, as indicated at 44, Figure 5, and in the block 38 there is slidingly mounted a valve member 45 by which the passage in the U-shaped member at its bridge portion may be restricted or entirely closed.

The valve member has a rod 46 extending from its outer end which is connected to one end of a bell crank lever 47, the bell crank being mounted upon the hub 14 and having its other end connected to a rod indicated at 48 which extends through the steering wheel of the automobile. It is of course to be understood that other means are associated with the end of said rod whereby the valve member may be operated at will by the driver of the automobile.

It may be here mentioned that the present brake mechanism may be employed for both a service brake and emergency brake. When it is desired to utilize the same as a service brake, the rod 29 should be moved for shifting the sleeve 22 upon the spindle 12, so that the friction disks 31 and 32 will engage and the rotative movement of sleeve 22 be imparted to the casting 18. With the casting 18 rotating the gears 37 likewise rotate and reciprocate the connecting rods 42. As is shown in Figure 3, the connecting rods 42 are so arranged that when one rod is making its forward stroke, the other rod is making its return stroke, thus causing the pistons 40 to pump the oil within the U-shaped tube 39 back and forth, and this causing a slight amount of retardation to the movement of the pistons. In this way the rotative movement of the casting 18 is also slightly retarded and likewise the sleeve 22, thus imparting what may be termed a braking action to the wheel 10. It is to be pointed out that this braking action is sufficient to bring the automobile to a gradual stop and without in any way imposing any strain upon the wheel thereof, or any great wear upon the tires.

When it is desired to utilize the braking mechanism as an emergency brake, then it is only necessary to restrict the passage through the bridge portion of the U-shaped member 39 by manipulating the valve member 45 through the operating rod 48. When this passage is restricted the force necessary to move the pistons 40 is increased and therefore a greater braking action imparted to the spindle 12. If it is desired to utilize the emergency brake feature to its greater extent then the valve member 45 is moved to entirely close the passage in the bridge portion of the U-shaped member 39 and thus locking the pistons 40 against movement within the U-shaped member and also locking the spindle 12 against rotative movement.

Referring to Figure 6 of the drawings, 49 indicates a rear axle housing of an automobile, 50 the differential housing and 51 the associated wheels. The purpose of this figure is to illustrate a different manner of mounting and positioning the present brake mechanism. In this instance, the pair of shafts 52 are positioned above the rear axle and rotatably supported at their inner ends by the means of bearing brackets as shown, while their outer ends are likewise supported in the hub members 53. Upon the outer end of each shaft 52 there is fixed a gear 54 and said gear, in each instance, being adapted to mesh continuously with an internal gear formed upon the inner surface of the associated brake drum. Upon the inner end of each shaft there is carried a brake unit 55 similar to the brake mechanism heretofore described, which may be operated by rods or cables extending within convenient reach of the driver of the automobile in the manner heretofore described.

Also there may be a brake band as indicated at 56 and this brake band may be utilized as a service brake if desired.

I claim:

1. A brake mechanism of the class described comprising in combination, a wheel, a ring gear, means for connecting said ring gear for rotation with said wheel and hydraulic means associated with said ring gear whereby its rotative movement may be retarded.

2. A brake mechanism of the class described, comprising in combination, a wheel, a rotatable member, means for connecting said rotatable member whereby to rotate with said wheel, and hydraulic means for adjustably retarding the rotatable member whereby to brake the movement of said wheel.

3. A brake mechanism of the character described comprising in combination, a wheel, a spindle therefor and rotatable with said wheel, a ring gear loosely journaled upon said spindle, means operable from a remote point for connecting said ring gear to be driven by said spindle, and means for adjustably retarding the rotative movement of said ring gear.

4. A brake mechanism of the character described comprising in combination, a wheel, a spindle therefor and rotatable with said wheel, a ring gear loosely journaled upon said spindle, and hydraulic means for locking said ring gear against rotative movement, said means being operable from a remote point.

5. A brake mechanism of the character described comprising in combination, a wheel, a spindle therefor, rotatable with said wheel, a ring gear loosely journaled upon said spindle, means adapted to cause said gear to rotate with said spindle, said means being operable from a remote point, a pair of fixed gears adapted to constantly mesh with said ring gear and means associated with said fixed gears whereby their rotative movement is retarded.

6. A brake mechanism of the character described comprising in combination, a wheel, a spindle therefor, rotatable with said wheel, a ring gear loosely journaled upon said spindle, means adapted to cause said gear to rotate with said spindle, said means being operable from a remote point, a pair of fixed gears adapted to constantly mesh with said ring gear, and means associated with said fixed gears whereby they may be locked against rotative movement.

7. A brake mechanism of the character described comprising in combination, a wheel, a spindle therefor, rotatable with said wheel, a ring gear loosely journaled upon said spindle, means adapted to cause said gear to rotate with said spindle, said means being operable from a remote point, a pair of fixed gears adapted to constantly mesh with said ring gear, and means operable from a remote point whereby the rotative movement of said fixed gears may be retarded.

8. A brake mechanism of the character described comprising in combination, a wheel, a spindle therefor, rotatable with said wheel, a ring gear loosely journaled upon said spindle, means adapted to cause said gear to rotate with said spindle, said means being operable from a remote point, a pair of fixed gears adapted to constantly mesh with said ring gear, and means operable from a remote point whereby said fixed gears may be locked against rotative movement.

9. A brake mechanism of the character described comprising in combination, a wheel, a spindle therefor, rotatable with said wheel, a ring gear loosely journaled upon said spindle, means adapted to cause said gear to rotate with said spindle, said means being operable from a remote point, a pair of fixed gears adapted to constantly mesh with said ring gear, a pair of cylinders, a piston for each cylinder, connecting means between each piston and a fixed gear to cause reciprocating movement of said pistons, and means for retarding the movement of said pistons.

10. A brake mechanism of the character described comprising in combination, a wheel, a spindle therefor, rotatable with said wheel, a ring gear loosely journaled upon said spindle, means adapted to cause said gear to rotate with said spindle, said means being operable from a remote point, a pair of fixed gears adapted to constantly mesh with said ring gear, a pair of cylinders, a piston for each cylinder, connecting means between each piston and a fixed gear to cause reciprocating movement of said pistons, and means for locking said pistons against movement.

11. A brake mechanism of the character described comprising in combination, a wheel, a spindle therefor, rotatable with said wheel, a ring gear loosely journaled upon said spindle, means adapted to cause said gear to rotate with said spindle, said means being operable from a remote point, a pair of fixed gears adapted to constantly mesh with said ring gear, a hollow U-shaped member, a piston operable in each leg of the U-shaped member, connecting means between said pistons and the fixed gears whereby reciprocating motion will be imparted thereto, and a liquid in said U-shaped member between said pistons.

12. A brake mechanism of the character described comprising in combination, a wheel, a spindle therefor, rotatable with said wheel, a ring gear loosely journaled upon said spindle, means adapted to cause said gear to rotate with said spindle, said means being operable from a remote point, a pair of fixed gears adapted to constantly mesh with said ring gear, a hollow U-shaped member, a piston operable in each leg of the U-shaped member, connecting means between said pistons and the fixed gears whereby reciprocating motion will be imparted thereto, and a liquid in said U-shaped member between said pistons, and means operable from a remote point whereby the passage of said U-shaped member between the pistons may be restricted.

13. A brake mechanism of the character described comprising in combination, a wheel, a spindle therefor, rotatable with said wheel, a ring gear loosely journaled upon said spindle, means adapted to cause said gear to rotate with said spindle, said means being operable from a remote point, a pair of fixed gears adapted to constantly mesh with said ring gear, a hollow U-shaped member, a piston operable in each leg of the U-shaped member, connecting means between said pistons and the fixed gears whereby reciprocating motion will be imparted thereto, and a liquid in said U-shaped member between said pistons, valve means by which the passage of said U-shaped member between the pistons may be controlled.

14. A brake mechanism of the character described comprising in combination, a wheel, a spindle therefor, rotatable with said wheel, a ring gear loosely journaled upon said spindle, means adapted to cause said gear to rotate with said spindle said means being operable from a remote point, a pair of fixed gears adapted to constantly mesh with said ring gear, a hollow U-shaped member, a piston operable in each leg thereof, connecting means between said pistons and fixed gears whereby reciprocating motion in reverse order will be imparted thereto during the rotation of said ring gear, a liquid within the U-shaped member adapted to fill the passage between the pistons.

15. A brake mechanism of the character described comprising in combination, a wheel, a spindle therefor, rotatable with said wheel, a ring gear loosely journaled upon said spindle, means adapted to cause said gear to rotate with said spindle said means being operable from a remote point, a pair of fixed gears adapted to constantly mesh with said ring gear, a hollow U-shaped member, a piston operable in each leg thereof, connecting means between said pistons and fixed gears whereby reciprocating motion in reverse order will be imparted thereto during the rotation of said ring gear, a liquid within the U-shaped member adapted to fill the passage between the pistons, and valve means adapted to restrict the passage in said U-shaped member between said pistons, said valve being controllable from a remote point.

FREDERICK H. MORLAN.